(12) United States Patent
Biancardini et al.

(10) Patent No.: US 8,108,497 B2
(45) Date of Patent: Jan. 31, 2012

(54) SELECTIVE ENABLEMENT OF RUNTIME-BASED APPLICATION BEHAVIORS

(75) Inventors: Sylvain Biancardini, Paris (FR); Christophe Planty, Paris (FR); Eric Guyard, Argenteuil (FR)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 12/425,115

(22) Filed: Apr. 16, 2009

(65) Prior Publication Data

US 2010/0268581 A1 Oct. 21, 2010

(51) Int. Cl.
*G06F 13/00* (2006.01)
(52) U.S. Cl. ......... 709/221; 709/220; 709/223; 717/174
(58) Field of Classification Search .......... 709/220–223, 709/217–219; 717/174–178
See application file for complete search history.

(56) References Cited

U.S. PATENT DOCUMENTS

| | | | |
|---|---|---|---|
| 5,347,629 A | 9/1994 | Barrett et al. | |
| 6,490,564 B1* | 12/2002 | Dodrill et al. | 704/275 |
| 6,952,800 B1* | 10/2005 | Danner et al. | 715/234 |
| 6,963,930 B2 | 11/2005 | Halpert et al. | |
| 7,233,902 B1 | 6/2007 | Dodrill et al. | |
| 7,321,918 B2 | 1/2008 | Burd et al. | |
| 7,346,840 B1 | 3/2008 | Ravishankar et al. | |
| 7,406,418 B2 | 7/2008 | Chiu | |
| 7,415,524 B2 | 8/2008 | Burd et al. | |
| 2004/0064830 A1 | 4/2004 | Irving et al. | |
| 2005/0155027 A1 | 7/2005 | Wei | |
| 2006/0047767 A1* | 3/2006 | Dodrill et al. | 709/206 |
| 2006/0200458 A1 | 9/2006 | Sankar | |
| 2008/0148298 A1 | 6/2008 | Chatterjee et al. | |
| 2011/0060810 A1* | 3/2011 | Dodrill et al. | 709/217 |

OTHER PUBLICATIONS

Polys, Nicholas F., "Stylesheet Transformations for Interactive Visualization: Towards a Web3D Chemistry Curricula", Proceedings of the eighth international conference on 3D Web technology, retrieved at <<http://delivery.acm.org/10.1145/640000/636606/p85-polys.pdf?key1=636606&key2=9875002321&coll=GUIDE&dl=GUIDE&CFID=18373962&CFTOKEN=17086427>>, Mar. 9-12, 2003, pp. 1-7.

"International Search Report", Mailed Date: Nov. 26, 2010, Application No. PCT/US2010/031097, Filed Date: Apr. 14, 2010, pp. 9.

* cited by examiner

Primary Examiner — Kenneth R Coulter
(74) Attorney, Agent, or Firm — Alleman Hall McCoy Russell & Tuttle LLP

(57) ABSTRACT

A system and method for deploying software from a central location to a plurality of remote install sites. The system includes a network-accessible server system and a plurality of computing devices. Based on delivery of a general application deliverable from the server system, a runtime-based application is installed at each of the computing devices. Varying tags are delivered from the network-accessible server system to generate various implementations of the runtime-based application at the computing devices.

18 Claims, 4 Drawing Sheets

US 8,108,497 B2

SELECTIVE ENABLEMENT OF RUNTIME-BASED APPLICATION BEHAVIORS

BACKGROUND

Oftentimes software applications are deployed from a server system to a variety of client computers via a network. However, if subsets of the client computers are to receive software having different behaviors and/or functionality, the server system may need to instead transmit customized or separate versions of the software application to each subset of client computers. Developing and maintaining different versions of the software application may be expensive and time-consuming for the software application developer.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter. Furthermore, the claimed subject matter is not limited to implementations that solve any or all disadvantages noted in any part of this disclosure.

Accordingly, the present description provides a system and method for deploying software from a central location to a plurality of remote install sites. The system includes a network-accessible server system and multiple remote computing devices. Each of the remote devices includes a runtime-based application having an initial implementation which is installed via delivery of a general application deliverable from the network-accessible server system. The runtime-based application is configured to receive a tag from the network-accessible server system, interpret the tag, and in response, dictate one or more pre-existing application behaviors of the runtime-based application so as to create an alternate implementation of the runtime-based application. As will be discussed in detail below, use of tags to create varying implementations of the runtime-based application can provide advantages relating to installation, maintenance, upgrading and selective version/feature deployment of application software.

DETAILED DESCRIPTION

Figure 1:
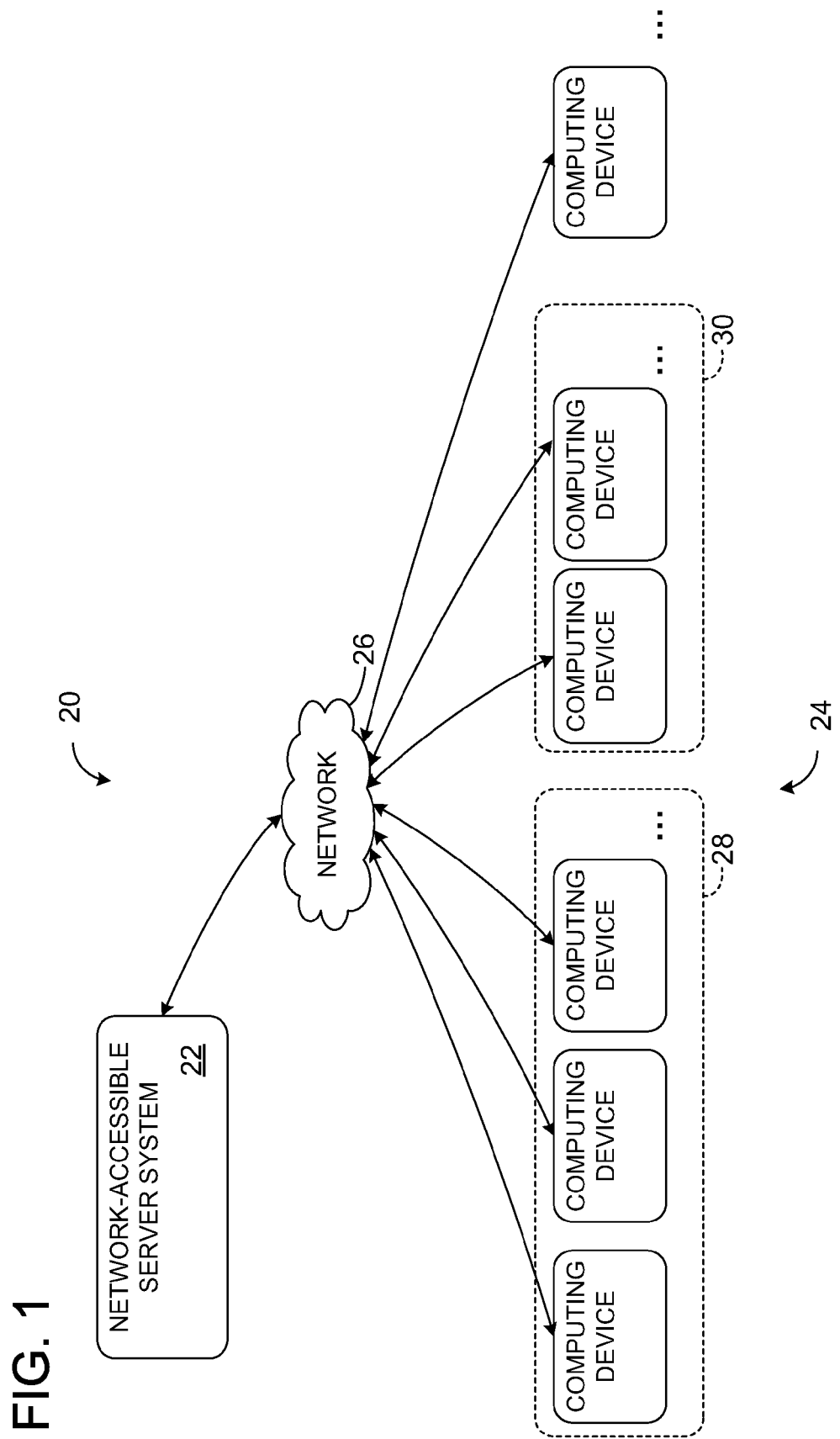
FIG. 1 shows a block diagram of an embodiment of a system for deploying software to a plurality of remote install sites from a central location.

FIG. 1 shows a system 20 for deploying installable software to a plurality of remote install sites (e.g., client computing devices). As indicated, system 20 may include a network-accessible server system 22 configured to interact with a plurality of computing devices 24 via a network 26. Computing devices 24 may include computing devices of any suitable type such as personal computers, portable digital assistants, digital media players, mobile phones and the like. Network-accessible server system 22 may be configured to transmit a general application deliverable (not shown) to the computing devices 24 via network 26. The general application deliverable may be configured to install (or facilitate installation of) an initial implementation of a runtime-based application on each of the computing devices 24 upon receipt. In other cases, the runtime-based application may be preinstalled and/or pre-embedded on computing devices 24. In such cases, the network-accessible server system 22 may be further configured to transmit an upgrade of the runtime-based application to computing devices 24 via network 26. In some cases, the upgrade may be configured to override the pre-installed and/or pre-embedded runtime-based application.

Network-accessible server system 22 may include one or more computing devices that may individually or collectively include and/or define a logic subsystem, a memory/data-storage subsystem, and the like, for performing the various functions and operations discussed herein. It will be appreciated that these and many other elements can be implemented without departing from the scope of the present disclosure.

Continuing with FIG. 1, network-accessible server system 22 may be further configured to transmit one or more tags (not shown) to each of the computing devices 24 via network 26. Such tags may be variously referred to herein, depending on the setting, as contextual modifier tags, contextual modifiers or modifier tags. Such tags may be XML-based tags that are interpretable by the runtime-based application. In some cases, tags may be separately transmitted to computing devices 24. Alternatively, one or more tags may be included within an XML document transmitted to computing devices 24. In such a case, upon receipt of the tags, the runtime-based application of each of the computing devices 24 is configured to interpret the tags and in response, dictate one or more pre-existing application behaviors of that runtime-based application so as to create an alternate implementation of the runtime-based application. Such a behavior may be "pre-existing" in that a runtime-based application, as initially installed, has the potential for performing the behavior, though it may, in a particular implementation, not exhibit that behavior because the relevant enabling tag has not been provided to the application.

In other words, the code of the runtime-based application may include, for example, hundreds of pre-existing features and/or behaviors that may be employed within the application. The tags may be configured to selectively enable or disable each of these features, and/or control the way the features operate. As an example, the tags may act as switches by indicating a particular feature to be "ON" or "OFF." As another example, tags may provide a string or integer definition of a configuration parameter and/or variable associated with a particular feature, as described in more detail below. Upon receiving such tags, the runtime-based application can then "interpret" the tags by processing the tags to selectively enable or disable features within the runtime-based application as indicated by the tags. Accordingly, such an approach is distinct from a software patch in that software patches typically provide new code whereas the example tags herein typically are used to selectively enable or disable features pre-existing within the runtime-based application.

Tags may dictate behavior of an application by enabling/disabling features of the initial application, by providing alternate mechanisms for like functionality, or by providing alternate layouts or user-interface regimes, to name but a few examples, so as to yield an alternate implementation of the application. For example, tags may dictate application behaviors in an e-commerce application by specifying one or more of a number of different predetermined ways in which a shopping cart feature set is implemented. As another example, mobile phone carriers may use tags to enable certain features of mobile phone software application that are specific to the carrier. Selectively enabling application behaviors of a runtime-based application is discussed in more detail with reference to method 40 of FIG. 2.

In some embodiments, the plurality of computing devices 24 may be grouped into populations, such as a first population 28 and second population 30 indicated in FIG. 1 by dashed boxes. In such embodiments, population groups or subgroups may be based on any suitable criteria such as the geographic locations of the computing devices, types of computing devices, service provider of the network connections between the network-accessible server and the computing devices, etc. Examples of additional suitable criteria may include user preferences, a user language setting, an application version, a device firmware version, a user subscription model/contract, network bearer/bandwidth and the like. Thus, a potential advantage of system 20 is that once an initial implementation of a runtime-based application has been generally deployed to a plurality of remote install sites, tags may be used to dictate different application behaviors at different install sites to create different implementations of the application. Not only may the tags be substantially smaller than the deliverable that installed the initial implementation of the application, thus allowing for more efficient/quicker transmission, but the tags may allow the application behavior to be customized specifically for any subset of the remote install sites without requiring another full software installation.

For example, software for a mobile phone carrier typically has characteristics that are associated with the service providers and/or geographic regions. A system such as system 20 allows for efficient distribution of a general application deliverable which may contain all potential features, wherein a specific implementation to one customer population is enabled or activated via a tag for that group. In such a case, each mobile phone carrier may receive a different tag causing their application to be of a specific implementation different from those of the other carriers.

Further, a system such as system 20 may be applicable to application updates and/or upgrades. For example, using the mobile phone example above, a carrier may decide to add additional features to the application. A network-accessible server system may then transmit one or more tags to allow for these additional features to be activated within the existing application, thus creating an alternate implementation of the application. By not requiring transmittal of an entirely new install of the application, time and resources may be conserved.

Figure 2:
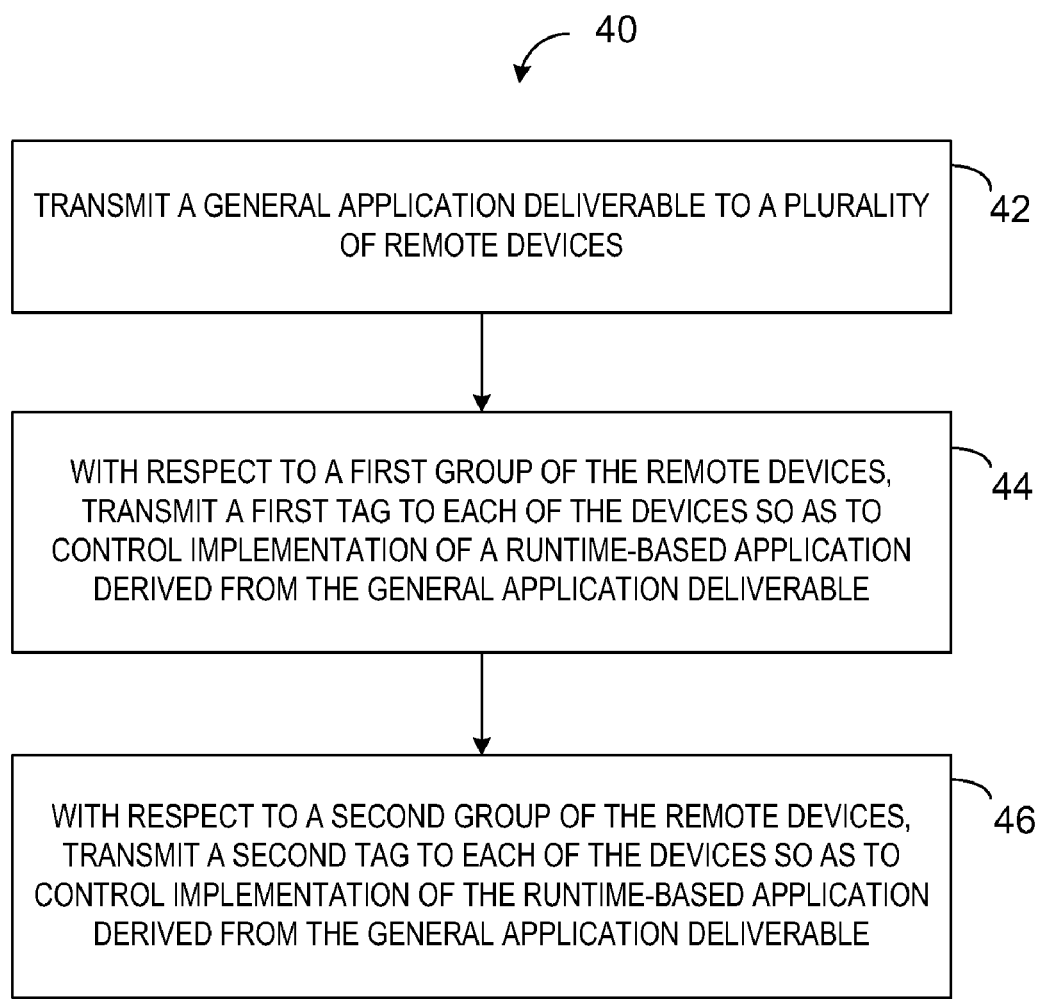
FIG. 2 shows a flow diagram of an exemplary method of selectively enabling application behaviors of a runtime-based application.

Turning now to FIG. 2, the figure shows a method 40 of selectively enabling application behaviors of a runtime-based application. At 42 method 40 includes transmitting a general application deliverable to a plurality of remote devices. Such a general application deliverable may be of any suitable configuration, such as a container application including a modular structure of the runtime-based application. Such a general application deliverable may also be configured to deploy the runtime-based application to a variety of platforms from a single codebase. In some embodiments, the network-accessible server may be a network-accessible server system 22 as described above with reference to FIG. 1. Accordingly, the plurality of remote devices may be the plurality of computing devices 24. As described above, in some embodiments one or more of the remote devices may be portable computing devices, such as mobile phones.

The general application deliverable is configured to install or facilitate installation of an initial implementation of a runtime-based application at each of the remote devices. Such a runtime-based application may be configured to operate within a runtime environment. As an example, the runtime-based application may be an online product catalog of items available for purchase and/or download, such as an online music store. It is to be understood that such an application is exemplary in that the application could be any other suitable application, such as operating software for a mobile phone to run basic components such as calls, voicemail, contacts, calendar, alarms, etc.

At 44 method 40 includes with respect to a first group of the remote devices, transmitting a first tag to each of the devices so as to control implementation of a runtime-based application derived from the general application deliverable. The first group of remote devices may be a first population of computing devices of any suitable grouping such as described above with reference to FIG. 1. For example, population groups may be based upon criteria such as the geographic locations of the computing devices, types of computing devices, service provider of the network connections between the network-accessible server and the computing devices, and the like.

The first tag may be an XML-based modifier tag interpretable by the runtime-based application of each remote device of the first group of remote devices. Thus, upon interpreting the first tag, the tag dictates one or more application behaviors of that runtime-based application so as to create an alternate implementation of the runtime-based application. As such, the tag allows the alternate implementation of the runtime-based application of the first group of remote devices to have behaviors different from that of the initial implementation of the runtime-based application received via the general application deliverable. Thus, method 40 of selectively enabling application behaviors of a runtime-based application provides the potential benefit of customizing behavior specific to a subset of devices without requiring re-deployment and/or re-installation of the entire runtime-based application. Further, as described above, the tags are typically much smaller than the general application deliverable, and therefore are easier and/or quicker to transmit to the remote devices. In some cases, the tags may be an order of magnitude smaller than the application itself.

The first tag may dictate any number of possible behaviors in the runtime-based application. One possible category for behavior modification may include user interface modification. Behaviors modified via such tags may dictate custom views within the runtime-based application, such as the display layout of advertising banners within the application, position of elements within the application (e.g. a search-bar), and the like. For example, the application may display a promotional page, where the promotional offers may be displayed in a predefined layout as dictated by the tag. For example, in the context of a mobile phone provider, a general application deliverable may be sent to all the customers of the provider. However, the provider may offer two different levels of user contracts, wherein each contract level has a different set of features. As an example, a less expensive contract might include providing an abundance of advertising to the user, whereas the more expensive contract may be free of such advertising. In such as case, both versions of the general application deliverable may be implemented via tags, where the tag activates the advertising features within the application for users of the less expensive contract, and where the tag deactivates such features for users of the more expensive contract. It should be understood that additional behaviors may also be dictated by one or more additional tags, such as tags enabling and/or controlling presentation of the advertising content such as banners, sidebars, pop-ups, etc. As described above, such tags may be transmitted to the mobile phones in any suitable manner such as by transmitting the tags in a packet form, including the tags within an XML document, transmitting the tags separately, etc.

In another example, the application's homepage may display a list of items wherein the position of a "search" item within this list may be dictated by the tag. In yet another example, the homepage may display a set of promotional items based on a general parameter defining the number of items to be displayed, wherein the application may pick randomly a number of items to be displayed according a value of that parameter as based on the tag.

Figure 3:
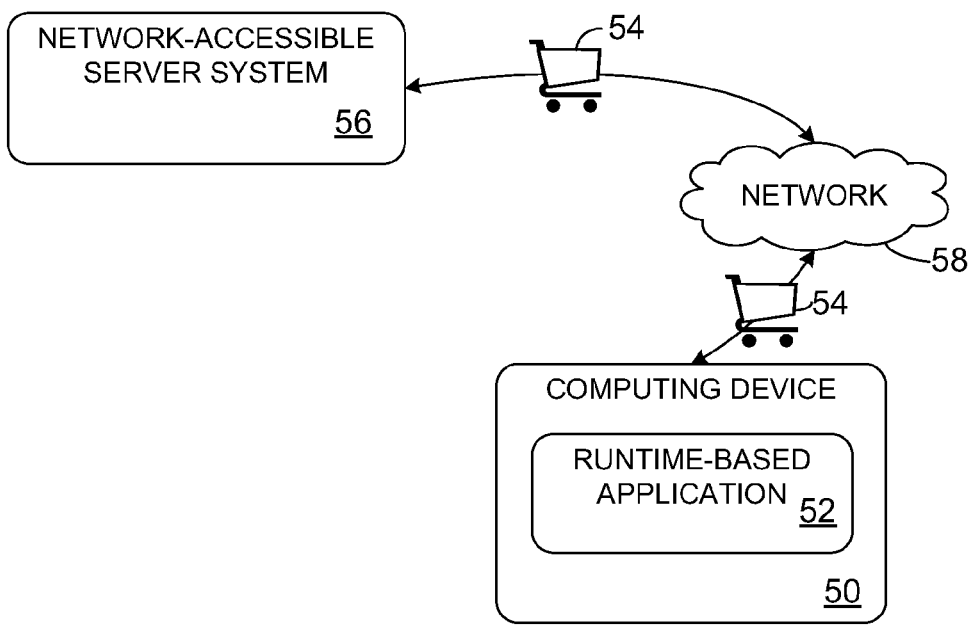
FIG. 3 shows a schematic depiction of an exemplary synchronization between a server system and a computing device.

Another possible category for behavior modification includes behaviors related to business logic. For example, tags may dictate activation or deactivation of a synchronization of bookmarked items between a computing device and the server. In such a case, tags may be used to dictate synchronization of a basket and/or wishlist in an online-shopping catalog application. As an example, FIG. 3 shows a schematic depiction of a computing device 50 including a runtime-based shopping application 52 configured via tags to allow synchronization of a shopping cart 54 with network-accessible server system 56 via network 58.

Figure 4:
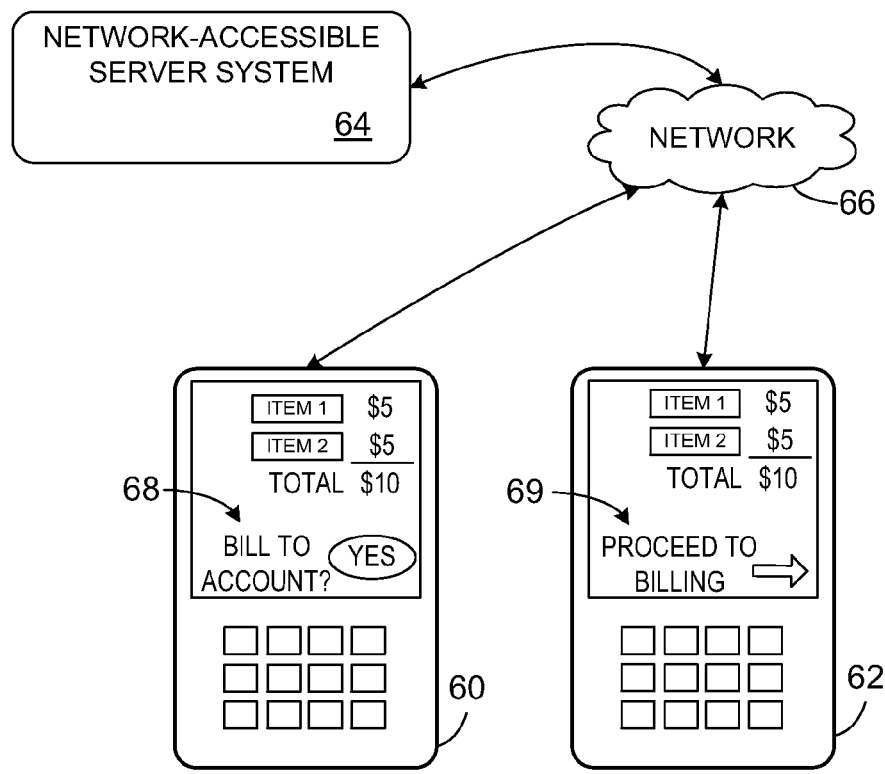
FIG. 4 shows a schematic depiction of an exemplary method and system for activating a billing feature.

In another example of behaviors related to business logic, a tag may be used to dictate billing functionality within the runtime-based application, for example, to dictate whether the application uses a billing system internal to the application to participate in electronic transactions over the network or whether the application directs the user to an external billing system. As an example, FIG. 4 shows a schematic depiction of an exemplary billing feature activation. Mobile phones 60 and 62 are configured to interact with network-accessible server system 64 via network 66. Mobile phones 60 and 62 are both running a same runtime-based application. However, the application on mobile phone 60 has an internal billing feature activated via tags such that a user of mobile phone 60 can purchase items directly from the application. As an example, such a user may have a user account associated with the application and the internal billing system feature for purchasing items directly through the application. Alternatively, the application on mobile phone 62 does not have the internal billing feature activated (i.e. the feature has been deactivated via tags), in which case the user of mobile phone 62 is directed to an external billing feature as shown at 69.

Figure 5:
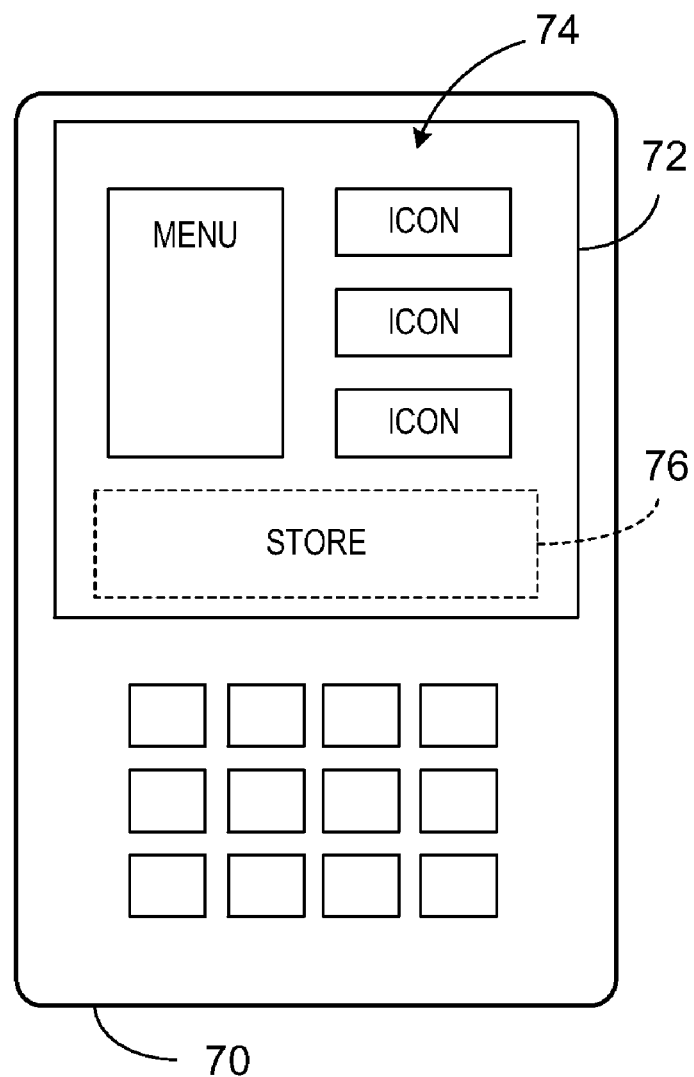
FIG. 5 shows a schematic depiction of an exemplary method and system for activating an application feature.

Further, tags may be used to dictate plugin and/or feature activation within an application. In other words, the tag may dictate activation or deactivation of plugins embedded in the application. As an example, in the context of the online music catalog discussed above, tags may be used to dictate behavior to allow the application to provide a music recognition service, and/or provide a web radio service. As another example, FIG. 5 shows a schematic depiction of an exemplary activation of an application feature. FIG. 5 shows a mobile phone 70 with a display screen 72 displaying a homepage 74 of a runtime-based application. Homepage 74 displays icons and a menu. It is to be understood that homepage 74 is exemplary in that it could display virtually any other images, text, icons, menus, searchbars, taskbars, and the like. The application being run on mobile phone 70 may include an additional feature of a store 76, indicated in dotted line, that may be activated or deactivated based on a tag. Such a store may include, for example, digital content items such as games, music, ringtones and the like available for download and/or purchase. As an example, a user of mobile phone 70 may have a limited service plan with his mobile phone service provider, such as pre-paid plan. In such a case, features such as store 76 within the application on mobile phone 70 may be deactivated via tags. Alternatively, a user of mobile phone 70 having an extended service plan with her mobile service provider, such as an enhanced data package, may run the same application yet have store 76 activated via tags.

Additionally, tags may be used to dictate other behaviors of the runtime-based application, such as providing platform bug workarounds, wrapper implementation strategy (i.e. an audio stream strategy) and hardware and platform fine-tuning (e.g., key codes, buffer sizes, drive names, etc.)

In some embodiments, the tags may indicate definitions of one or more configuration parameters. Such configuration parameters may act as binary "switches" to be turned on or off to yield the desired behavior. In other cases, configuration parameters may act as variables which may, for example, may indicate a selection from three or more options. As an example, a variable in the form of a string may indicate to the computing device which of three or more methods best fits the device's hardware, such as a wrapper implementation strategy that can be "StreamBuffer," "filebuffer," "rtspwrapper," "audiostrategy5," etc. As another example, a variable in the form of an integer may indicate the promotional layout to be a value selected from {2, 4, 6, 8} to adapt the computing device's view to a predefined view {1, 2, 3, 4}.

In some cases, variables may be applied directly as configuration parameters. As an example, a variable in the form of a string may indicate a drive name, and may be any value defined by a hardware device manufacturer. As another example, a variable in the form of an integer may indicate key codes for each action in the computing device (e.g., cursor up/down) by associating the action with an integer value provided by the hardware, which is some cases, may change from one device to another. In yet another example, a variable in the form of an integer may indicate buffer sizes to be any size in bytes which has been determined to be an optimal value for this kind of computing device/hardware solution.

As described above, the network-accessible server may transmit different tags to different populations of remote devices to modify an application installed by a general deliverable, with the result being alternate implementations of the application. Accordingly, at 46 method 40 includes with respect to a second group of the remote devices, transmitting a second tag to each of the devices so as to control implementation of a runtime-based application derived from the general application deliverable. The second tag may dictate any suitable type of behavior, as described above with reference to the first tag. Thus, method 40 may yield a first alternate installation of the runtime-based application on the first group of remote devices, and a second alternate installation of the runtime-based application on the second group of remote devices.

In some embodiments, the above described methods and processes may be tied to a computing system. As an example, FIG. 1 schematically shows a system 20 that may perform one or more of the above described methods and processes. System 20 may include a logic subsystem and a data-holding subsystem. Computing devices 24 may optionally include a display subsystem and/or other components not shown in FIG. 1.

As mentioned above, the central server system and/or remote devices will typically employ a processing or other logic subsystem to carry out the various functionality described herein. Data-holding subsystems and display subsystems may be employed as well. The logic subsystem may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

The data-holding subsystem may include one or more physical devices configured to hold data and/or instructions executable by the logic subsystem to implement the herein described methods and processes. When such methods and processes are implemented, the state of the data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and data-holding subsystem may be integrated into one or more common devices, such as an application specific integrated circuit or a system on a chip.

When included, a display subsystem may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem and/or a data-holding subsystem in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for deploying software from a central location to a plurality of remote install sites, comprising:
   a network-accessible server system; and
   a plurality of client computing devices, wherein each of the plurality of client computing devices is a portable computing device including a runtime-based application to be executed on the respective client computing device and having an initial implementation which is installed via delivery of a general application downloaded from the network-accessible server system, the runtime-based application configured to operate within a runtime environment and to receive one or more tags from the network-accessible server system via a network,
   wherein the runtime-based application is further configured, upon receipt of a tag from the network-accessible server system, to interpret the tag, and in response to the tag, dictate one or more pre-existing application behaviors of the runtime-based application so as to create an alternate implementation of the runtime-based application, and
   wherein each of the plurality of client computing devices is part of either a first group or a second group, and wherein the network-accessible server system is configured to transmit a first tag to the first group and a second tag which is different from the first tag to the second group, and wherein such provision of different tags causes computing devices of the first group to run a different implementation of the runtime-based application than is run by computing devices of the second group.

2. The system of claim 1, wherein each of the plurality of client computing devices is a mobile phone, and wherein provision of different tags causes mobile phones of the first group to run operating software which differs from that run by mobile phones of the second group.

3. The system of claim 1, wherein the tag causes activation of billing functionality so as to enable the alternate implementation of the runtime-based application to be used to participate in electronic transactions over the network.

4. The system of claim 1, wherein the tag causes activation of a user interface in the alternate implementation of the runtime-based application which differs from that employed in the initial implementation.

5. The system of claim 1, wherein the runtime-based application is configured to provide an electronic catalog, and wherein the tag causes the alternate implementation of the runtime-based application to use a catalog display layout that differs from that employed in the initial implementation.

6. The system of claim 1, wherein the tag is configured to control presentation of advertising content in the alternate implementation of the runtime-based application.

7. The system of claim 1, wherein the tag is configured to control synchronization of shopping cart functionality in the alternate implementation of the runtime-based application.

8. The system of claim 1, wherein the tag is an XML-based tag.

9. A method of selectively enabling application behaviors of a runtime-based application, the method comprising:
   transmitting from a network-accessible server system a general application deliverable to each of a plurality of client computing devices, wherein the general application deliverable is configured to cause installation of a runtime-based application on each of the plurality of computing devices and be executed on the respective client computing device;
   transmitting a first tag from the network-accessible server system to each client computing device in a first subgroup of the plurality of client computing devices;
   based on the first tag, activating a first alternate implementation of the runtime-based application at each client computing device in the first subgroup;

transmitting a second tag from the network-accessible server system to each client computing device in a second subgroup of the plurality of client computing devices, wherein the second tag is different from the first tag; and based on the second tag, activating a second alternate implementation of the runtime-based application at each client computing device in the second subgroup.

10. The method of claim 9, wherein each of the plurality of client computing devices are mobile phones, and wherein the first alternate implementation and the second alternate implementation are alternate implementations of mobile phone operating software.

11. The method of claim 9, wherein the first alternate implementation and the second alternate implementation differ in billing functionality employed in connection with using the runtime-based application to conduct online electronic transactions.

12. The method of claim 9, wherein the runtime-based application is configured to provide an electronic catalog, and wherein the first alternate implementation and the second alternate implementation provide different catalog display items.

13. The method of claim 9, wherein the first tag and the second tag are XML-based tags.

14. A method of selectively enabling application behaviors of a runtime-based digital content catalog, the method comprising:

transmitting a general application deliverable from a network-accessible digital content server system to each of a plurality of mobile computing devices, the general application deliverable being configured to cause installation of a runtime-based digital content catalog upon each of the plurality of mobile computing devices, where the runtime-based digital content catalog is to be executed on the respective mobile computing device;

transmitting a first XML-based modifier tag from the network-accessible digital content server system to each mobile computing device in a first subgroup of the plurality of mobile computing devices;

based on the first XML-based modifier tag, activating a first alternate implementation of the runtime-based digital content catalog at each of the mobile computing devices in the first subgroup;

transmitting a second XML-based modifier tag from the network-accessible digital content server system to each mobile computing device in a second subgroup of the plurality of mobile computing devices; and based on the second XML-based modifier tag, activating a second alternate implementation of the runtime-based digital content catalog at each of the mobile computing devices in the second subgroup.

15. The method of claim 14, wherein the first alternate implementation and the second alternate implementation differ in a display layout used to graphically present downloadable digital content items available from the network-accessible digital content server system.

16. The method of claim 14, wherein the first alternate implementation and the second alternate implementation differ in billing functionality used to download and purchase digital content items from the network-accessible digital content server system.

17. The method of claim 14, wherein the first alternate implementation of the runtime-based digital content catalog is associated with a first geographic region, and where the second alternate implementation of the runtime-based digital content catalog is associated with a second geographic region.

18. The method of claim 14, wherein each of the plurality of mobile computing devices is a mobile phone.

* * * * *